(12) United States Patent  (10) Patent No.: US 7,897,041 B2
Stähler et al.  (45) Date of Patent: Mar. 1, 2011

(54) APPARATUS FOR AEROBIC BIOLOGICAL CLEANING OF WASTE WATER

(76) Inventors: Theo Stähler, Mühlenhof (DE);
Hubertus Stähler, Mühlenhof (DE)

( * ) Notice: Subject to any disclaimer, the term of this patent is extended or adjusted under 35 U.S.C. 154(b) by 311 days.

(21) Appl. No.: 11/794,551

(22) PCT Filed: Dec. 21, 2005

(86) PCT No.: PCT/EP2005/013825

§ 371 (c)(1),
(2), (4) Date: Feb. 23, 2009

(87) PCT Pub. No.: WO2006/072396

PCT Pub. Date: Jul. 13, 2006

(65) Prior Publication Data

US 2009/0230037 A1 Sep. 17, 2009

(30) Foreign Application Priority Data

Dec. 31, 2004 (EP) .................... 04031075

(51) Int. Cl.
*C02F 3/08* (2006.01)

(52) U.S. Cl. ................ 210/150; 210/619; 261/92

(58) Field of Classification Search ........... 210/150, 210/151, 619; 261/92
See application file for complete search history.

(56) References Cited

U.S. PATENT DOCUMENTS

| | | | |
|---|---|---|---|
| 3,886,074 A | | 5/1975 | Prosser |
| 4,028,244 A | * | 6/1977 | Holmberg ............ 210/150 |
| 4,093,539 A | * | 6/1978 | Guarino ............ 210/619 |
| 4,268,385 A | * | 5/1981 | Yoshikawa .......... 210/150 |
| 4,284,503 A | * | 8/1981 | Stahler ................ 210/150 |
| 4,318,810 A | * | 3/1982 | Stahler ................ 210/150 |
| 4,623,492 A | * | 11/1986 | Pastorek ............ 261/92 |
| 4,668,387 A | | 5/1987 | Davie et al. |
| 4,769,138 A | * | 9/1988 | Frandsen ........... 210/150 |
| 5,326,459 A | | 7/1994 | Hlavach et al. |
| 5,637,219 A | * | 6/1997 | Robinson et al. ...... 210/150 |
| 5,755,961 A | | 5/1998 | Limcaco |

(Continued)

FOREIGN PATENT DOCUMENTS

DE 881 990 7/1953

(Continued)

*Primary Examiner*—Christopher Upton
(74) *Attorney, Agent, or Firm*—Price, Heneveld, Cooper, DeWitt & Litton, LLP (57) ABSTRACT

An apparatus for aerobic biological treatment of waste water and the like includes a tank configured to retain waste water therein, and a wheel rotatably mounted in the tank. The wheel includes a plurality of chambers arranged in axial succession about the circumference of the wheel. The chambers include openings which are oriented generally upwardly and emerge from the waste water adjacent a top dead center position of the wheel and are oriented generally downwardly and submerged in the waste water adjacent a bottom dead center position of the wheel. An air drive mechanism rotates the wheel, and an air pipe communicates with the air drive mechanism, and is disposed generally below the wheel, and is configured to release air bubbles therefrom after the bottom dead center position. A plurality of bubble connectors are connected with and protrude radially outwardly from the wheel at locations preceding the openings, and are shaped to guide the bubbles from the air pipe through the openings into the chambers.

21 Claims, 4 Drawing Sheets

U.S. PATENT DOCUMENTS 6,039,873 A * 3/2000 Stahler ................. 210/619
6,837,991 B1 * 1/2005 Norris ................. 210/150

FOREIGN PATENT DOCUMENTS

| | | | |
|---|---|---|---|
| DE | 2544177 | A1 | 4/1977 |
| DE | 2638665 | A1 | 3/1978 |
| DE | 3411865 | A1 | 10/1985 |
| EP | 0014453 | A1 | 8/1980 |
| EP | 0853067 | A2 | 7/1998 |
| EP | 1338566 | A1 | 8/2003 |

* cited by examiner

Fig. 7

APPARATUS FOR AEROBIC BIOLOGICAL CLEANING OF WASTE WATER

BACKGROUND OF THE INVENTION

The invention relates to an apparatus for aerobic biological cleaning of waste water with a tank for holding the waste water and a wheel that can rotate in the tank around a horizontal axis, whereby the wheel has a number of chambers that are arranged axially in succession about the circumference of the wheel. Each chamber is provided with an opening, which adjacent the top dead center position of the wheel, emerges out of the waste water and is pointed upward, and adjacent the bottom dead center position of the wheel is submerged into the waste water and is pointed downward.

Apparatuses of this type for aerobic biological cleaning of waste water according to the so-called combined immersion element-activated sludge process are known in many variations from the state of the art.

In such device, the waste water cleaning occurs, on one hand, by the free-floating activated sludge (suspended biomass) and on the other, by adhering microorganisms on growing surfaces of the rotating immersion element formed by the walls of the chambers (sessile biomass). In this way, the activated sludge process is combined in one unit with the immersion element process.

Bucket wheels and tube wheels are used as preferred construction shapes for the combined process.

The bucket wheel with bucket segments is composed of several plastic segments arranged parallel to the axis. These consist of a number of profiled polypropylene plates. Their distinguishing characteristic is the forming of chambers (bucket segments), which are used for the entry of air during submerging the chambers in the waste water and enlargement of the colonization surfaces. They ensure the oxygen supply according to the requirements.

The tube wheel is identical in function to the bucket wheel. However, the colonizing surface and the volume of the air chambers are smaller. The modified construction shape results from the specific goals of the particular application. The tubes are arranged on the periphery of the wheel parallel to the axis of the wheel. They are typically constructed of joined plastic disks.

Equipping the rotating wheel with a paddle is generally known. This is used for mixing the waste water when the wheel turns in the tank.

The bucket wheel and/or tube wheel is driven by means of an electric motor by way of a gear that acts on the central bearing shaft of the wheel.

An apparatus of the type named at the beginning with the use of a tube wheel is known from DE 25 44 177 C2 and DE-OS 26 38 665. One apparatus that uses a bucket wheel is described in DE 34 11 865 C2 and EP 0 881 990 B1. Reference is made to EP 1 338 566 A1 regarding the further state of the art.

What is disadvantageous in the known apparatuses is the very great amount of construction effort needed in connection with the drive, which is necessary due to the electric motor and its mounting and the interaction of electric motor and gear, as well as gear and wheel. Besides that, this means a great deal of maintenance effort for the wheel drive. It is also disadvantageous that only the air that is pressed into the waste water by means of the chambers under the water surface during submersion of the chambers into the waste water contributes to the cleaning process of the waste water, whereby this air already escapes out of the chamber and goes back to the water surface when the chamber moves beyond bottom dead center.

According to the state of the art, forming the wheel of a number of disk or honeycomb elements arranged at a distance from each other that do not form any chamber and do not form any enclosed spaces apart from the openings is already known. To this extent, no compression of the air can occur with such a honeycomb immersion element.

U.S. Pat. No. 5,755,961 describes an aquarium system with an apparatus for pumping water through the system and for supporting bacterial grown. In this case, a treatment unit has a tank for water and a device for movement of the water. This device is designed as a wheel that is provided on its circumference with air capturing means. Below the wheel, in the area of the air capturing elements submerged in the water, an outlet opening of an air pipe is placed so that the rising air that is output from it enters into the air capturing means and as a result the wheel is turned. The wheel has a first hollow section and a second section, which is used to displace the water and has a biological filter for promoting the bacterial growth. When the wheel turns, the second section of the wheel submerges into the water and causes an increase of the water level in the tank. As a result of this, the water can leave the tank over an overflow threshold. As soon as the second section has emerged from the water again, the lower water level develops in the tank again, with the consequence that water flows out of the system into the tank. With continued rotation of the wheel, a pumping of the water through the system thus occurs. When the second section emerges out of the water, about half the wheel submerges into the water located in the tank.

U.S. Pat. No. 3,886,074 describes an apparatus for biological treatment of waste water, wherein wheel-shaped immersion element submerges with less than half of its diameter into waste water located in a tank and is rotated around a horizontal axis by means of air. The air is output below the immersion element, behind its bottom dead center, from an air pipe and enters into pocket-shaped parts that are arranged on the circumference of the wheel.

U.S. Pat. No. 4,668,387 describes a device for treating waste water that also has an immersion element that can rotate around a horizontal axis in a tank filled with waste water. It is suggested that the immersion element submerges completely into the waste water and is driven by means of compressed air that is supplied in a lower area of the tank that holds the immersion element.

EP-A 14 453 discloses an immersion trickling filter with chambers to which a gas containing oxygen is supplied so the immersion trickling filter is turned.

SUMMARY OF THE INVENTION

One object of the present invention is to further develop an apparatus of the type described above in such a way that it has an especially simple design, a low maintenance drive for the wheel and an especially high efficiency in cleaning the waste water.

Another object of the present invention is achieved with an apparatus of the type described above in that an air drive is provided for the wheel, whereby the air is output from an air pipe, in such a way that it arrives in the chambers behind its bottom dead center relative to the rotational direction of the wheel, and a shaped part that points radially outward is connected to the respective chamber such that air that is output from the air pipe is guided into the opening of the chamber or into the opening of the chamber rotational prior to this chamber.

In contrast to the state of the art, in which the air is carried into the water exclusively by means of the chambers, now according to the present invention air is output from below by the air drive, so that this air arrives at the wheel and flows into the chambers oriented toward the air pipe. Thus not only air that is brought into the water by the chambers is available for the biological cleaning process, but also the air output from the air pipe that generates a lift on the chambers during movement in the direction of the water surface. It is considered especially advantageous if the ratio of carried air to lift air is ⅓ to ⅔. The carried air and the lift air are compressed in the respective chamber and act on the growing surfaces and/or the biological turf that is formed in the chamber.

Thus according to the invention, no electrical drive is necessary, except for a gear to transfer the rotary movement of the electrical motor to the wheel through a simple fan or the like, which supplies the air pipe and the air is output from there in the direction of the wheel. Because of the new drive concept, the wheel can be designed so it is significantly lighter. The relatively heavy components of the gear are dispensed with, for example, pinion, ring gear and chain. It is just these components that are no longer needed in the present invention that are subject to wear. Because of the air drive and the lift involved with it, the wheel is lighter overall. Therefore it can be sized more simply. In this case as well, the construction effort for manufacturing the wheel is reduced significantly and the wheel can be produced less expensively. Ultimately, in contrast to the state of the art, it is only necessary to mount the axle of the wheel in bearing bushings. These are the only wear parts.

It is also advantageous that the air is output at elevated pressure and thus comes into the respective chamber in compressed state. The waste water can absorb a higher percentage of oxygen in its compressed state.

What is important in the present invention is that a significant percentage of the air is supplied in a defined form to the chambers. For example 80-90% of the output air is guided into the chambers, 10-20% goes past the chambers and is used for mixing the waste water in the tank. A shaped part or bubble collector is connected to the respective chamber and guides the air output from the air pipe into the chamber to which the shaped part is connected, or into the chamber that is before this chamber in rotation direction of the wheel. The wheel can be designed in an especially simple manner if the shaped part is connected to the chamber, and communicates with the opening in which the air is guided by means of this shaped part. In this case, the chamber and the shaped part form a construction unit in which the shaped part is pointed in the direction of this opening. It is especially advantageous if the shaped part overlaps the opening and forms an accumulating chamber for the compressed air between the element and the shaped part. This accumulating chamber simultaneously forms a retaining chamber for a significant part of the air when the chambers ascend due to the rotary movement of the wheel.

If the shaped part connected to the chamber guides the air into the opening of the chamber in front of this chamber, it is considered to be advantageous if this shaped part, upon release of the air onto the shaped part, overlaps the opening of the preceding chamber in vertical alignment. In this way, a significant part of the air is guided from the shaped part into the opening of the preceding chamber.

The chamber and the shaped part should be designed geometrically in such a way that the chamber is filled to about 30% to 80% of its chamber volume with air.

Another significant advantage of the invention with air carried in and air lift can be seen in that the wheel can submerge significantly deeper into the waste water than is the case with apparatuses known from the state of the art. In the known apparatuses it is necessary that a considerable percentage of the wheel diameter emerge from the waste water located in the tank. With the apparatus according to the present invention, it is completely adequate that the wheel only extends around 5 to 15%, and especially 10%, of its wheel diameter over the level of the waste water located in the tank.

The air can be supplied to the chambers in all different ways. An especially simple design provides that the air pipe is arranged parallel to the wheel axis of rotation and extends essentially over the axial length of the wheel, whereby the air pipe is provided with a number of outlet openings for output of the air over the length of the air pipe.

Any suitable air drive can be used, especially a fan or pump. It is sufficient if it generates air at a pressure of around 0.3-1.0 bar. This is to be selected depending on the diameter of the wheel and its submersion depth. This pressure can overcome the pressure of the opposing water column. The air output by the air drives will get into the chambers and the compression is maintained until the chamber emerges.

The hollow element for forming the chambers can be designed in any way, e.g. round or with corners, and especially with square or triangular cross section.

According to one embodiment of the invention, the chambers are formed by a number of plastic plates inserted in each other, whereby the adjacent plastic plates form the respective chambers. It is considered to be especially advantageous if the respective plastic plate and the shaped part form a component. This component is especially cast.

These and other advantages of the invention will be further understood and appreciated by those skilled in the art by reference to the following written specification, claims and appended drawings.

BRIEF DESCRIPTION OF THE DRAWINGS

In the figures, the invention is shown in an exemplary way in several embodiments, without being restricted to them.

In the figures.

DETAILED DESCRIPTION OF THE PREFERRED EMBODIMENTS

Figure 1:
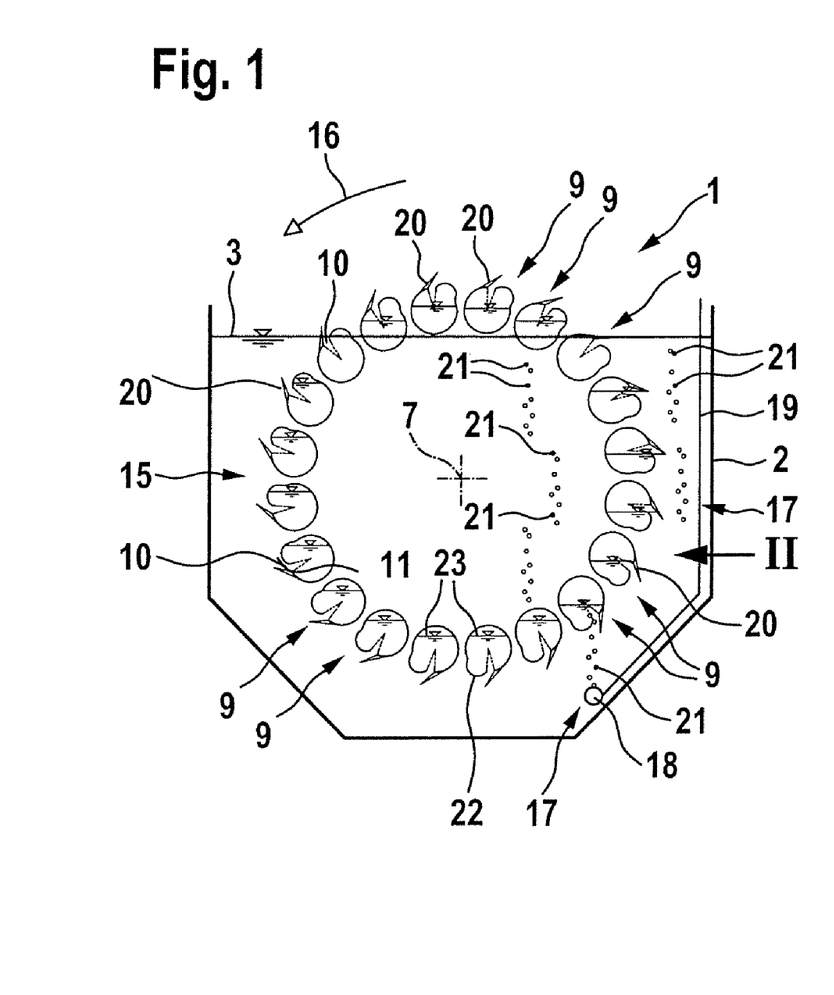
FIG. 1 shows the device according to the invention for an embodiment designed as a tube wheel in a cross section representation along line I-I in FIG. 2.
Figure 2:
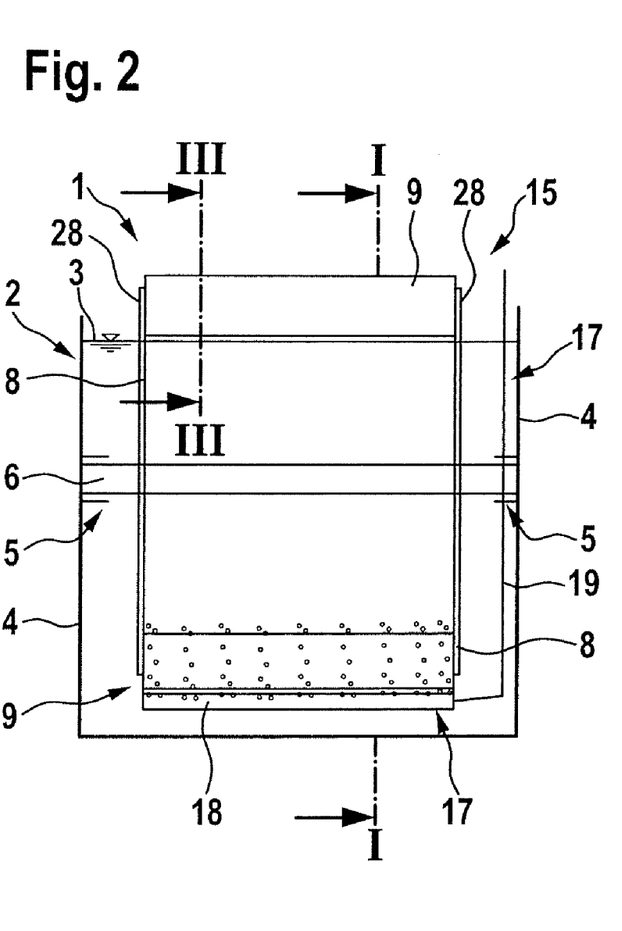
FIG. 2 shows a view of the device shown in FIG. 1, seen in the direction of arrow II according to FIG. 1.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
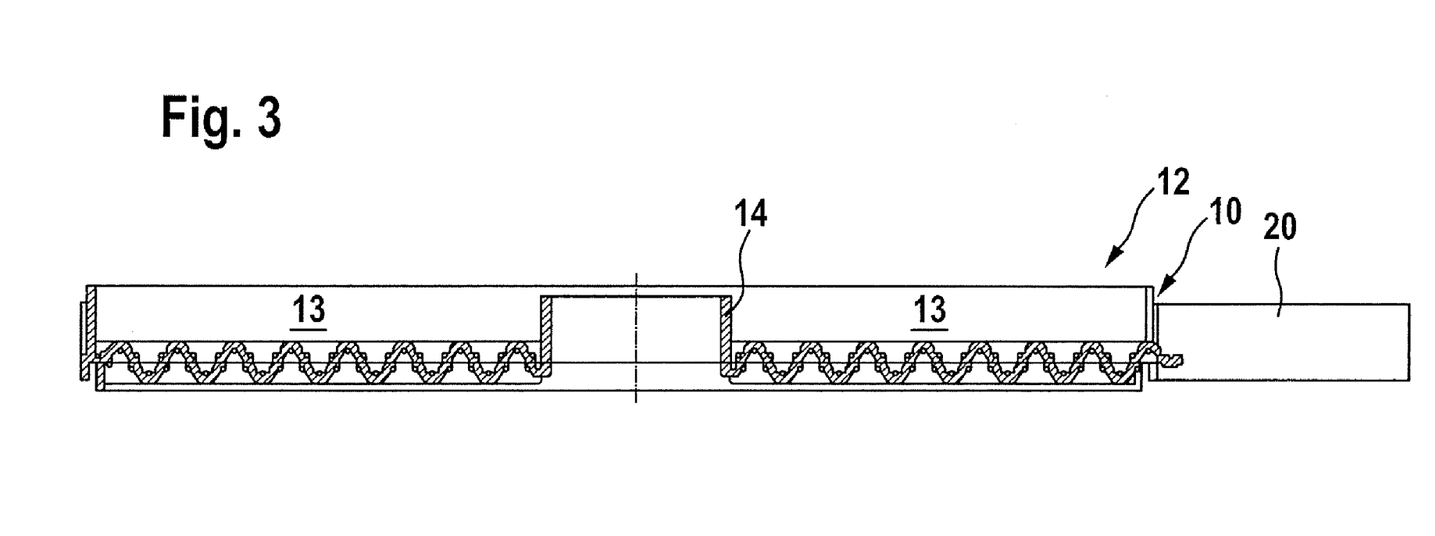
FIG. 3 shows a cross section through a plastic disk, whereby by joining a number of plastic disks a tube of the tube wheel is formed, shown in a cross section along line III-III in FIG. 2.

With respect to the first embodiment of the tube wheel, FIGS. 1 to 3 show the device 1 for aerobic biological cleaning of waste water that is located in a tank 2. The water level of the waste water in the tank 2 is designated with reference number 3. The two side walls 4 of tank 2 hold bearing shells 5 for a shaft 6 that is mounted in them and can rotate around the axis 7. Spokes 8 are connected so that they rotate with shaft 6 and end plates 28 are connected to them. The end plates 28 hold a number of tubes 9 in the area of their circular end segments, in the exemplary embodiment twenty tubes 9. Each tube 9 has an essentially circular cross section. On the outer radial side of the respective tube 9 an opening 10 is provided, which extends at an angle 10 (shown in broken lines) relative to the circular section of tube 9, as shown in FIG. 1. Each tube 9 is made of a number of plastic plates 12 stacked next to each other, of which one plastic plate 12 is shown in FIG. 3. Between each two adjacent plastic plates 12, the respective opening 10 is formed, which thus has an extension in lengthwise direction of the shaft 6 that corresponds to the spacing of the adjacent plastic plates 12 in the area of the opening 10. FIG. 3 shows the opening 10, but not the other identical plastic plate to be arranged in the area of this opening 10 that interacts with the plastic plate 12 shown.

The plastic plates 12 can be designed in any way, for example round or with corners and especially as triangles or squares.

Because of the plastic plates 12 are stacked laterally next to each other, the respective tube 9 results with the chamber 13 formed between each two adjacent plastic plates 12. A bearing shaft (not shown) passes through the central flange 14 of the respective plastic plate 12, which is connected in the area of its two face sides to side walls 4. The bearing shaft is connected so that it rotates together with the end plates 28 and spokes 8 of the assembly and holds the plastic plates 12 so that they rotate together, with the respective openings 10 of the respective tubes 9 are pointed radially outwardly with respect to the axis 7.

The rotation direction of the tube wheel 15 formed of the tubes 9, the end plates 28, spokes 8 and the shaft 6 is shown with reference number 16 and occurs in counterclockwise direction related to the illustration in FIG. 1.

The device 1 is used to aerate the waste water. Because of the oxygen contained in the air, the pollutants contained in the waste water are converted to harmless substances, to the extent that these can be broken down by the oxygen in the air. A large surface of the plastic plates 12 that is accessible to air and water results because the plastic plates 12 have recesses and/or elevations, whereby their depths and/or heights are significantly smaller than the distance to adjacent disks. The consequence of this is that at these locations, a biological turf of microorganisms occurs after a relatively short period of time.

In the fill level shown in FIG. 1, the tube wheel 15 extends with about up to 10% of its diameter out of the liquid.

The tube wheel 15 is driven by means of an air drive or pneumatic drive 17. This has an air pipe 18 that is formed as a punched and/or perforated pipe that is arranged parallel to the shaft 6 of the tube wheel 15 and extends essentially over the axial length of the tube wheel 15. The air is supplied by way of an air pipe 19 to the air pipe 18 by a fan or pump that is not shown in more detail, and is arranged outside the tank 2. The air drive generates air at a pressure of 0.3 to 1.0 bar.

As can be seen especially from the illustration in FIG. 1, the air is output from the air pipe 18 below the tube wheel 15 in such a way that the air enters into the chambers 13 behind the bottom dead center of the wheel with respect to its rotation direction 16. With the respective plastic plate 12, a shaped part or bubble collector 20 is connected that has the special task of capturing a majority of the air output from the air pipe 18, represented by various bubbles 21, and conducting or guiding the bubbles into the chamber 13. This part 20 can have all different shapes and is therefore designated as a shaped part or bubble collector. The respective plastic plate 12 and the shaped part 20 assigned to it may be made as cast parts.

In the embodiment according to FIGS. 1 to 3, starting from the actual tube 9, the shaped part 20 is positioned opposite the direction of rotation 16 but with a radial outward component with respect to the shaft 6 of the tube wheel 15. This means that with the tube 9 that is arranged above the bubbles 21, ascending from the compressed air pipe, the shaped part 20 is oriented approximately vertically. The respective tube 9 also has the particular feature that it has a bulge 22 that points outwardly in the area of the tube 9 and/or the respective plastic plate 12 oriented away from the opening 10.

In FIG. 1, the fill level is shown for the respective tube 9, i.e. for the chamber 13 formed between two adjacent plastic plates and the liquid level is designated there with the reference number 23.

As already explained, the tube wheel 15 is put in rotation by the air drive 17. The bubbles 21 coming out of the air pipe 18, i.e. compressed air, is largely supplied by the shaped part 20 to the opening 10 during rotation of the tube wheel 15 and thus comes into the chamber assigned to the respective opening 10. The tube wheel 15 continues to turn in rotational direction 16, and air gets into the following or trailing tube 9. FIG. 1 shows that, starting from tube 9, that is located directly above the air pipe 18, the majority of the chambers 13 are filled with air. If the tube 9 reaches a position that corresponds to a position of the small hand of the clock at approximately 2 o'clock, the shaped part 20 can no longer hold the air back completely in the chamber 13, so the air shifts or beads upwardly along the radial outer edge of shaped part 20. When tube 9 goes above the water level 3, liquid remains in the respective tube 9. With a further rotation of the tube end 15 when the position of tube 9 reaches about 11 o'clock, the tube 9 submerges back into the liquid and, especially because of the bulge 22, which represents a cavity that is still closed toward the top, takes an air bubble along with it below the water surface 3. In the further course of rotation the tube 9, and especially the bulge 22, prevents the air bubble from going upward. Since the water pressure increases with positioning of the tube 9 further down in the tank during further turning of the tube wheel 15, the air bubble is thus compressed more. After going past bottom dead center, the tube 9 shifts back into the area of the air pipe 18.

Because of the design of the tube wheel and of the air drive 17, there is almost always air in the chambers 13 during the entire passage of the tube 9 through the water. The air passes alternately over the biological turfs during the rotation. Because of the sinusoidal design of the plastic plate 12 in the area radially outside the flange 14 during the rotation of the turf, the highest oxygen exchange can be recorded in the area of the turf. This increases the efficiency of the waste water cleaning significantly.

Figure 4:
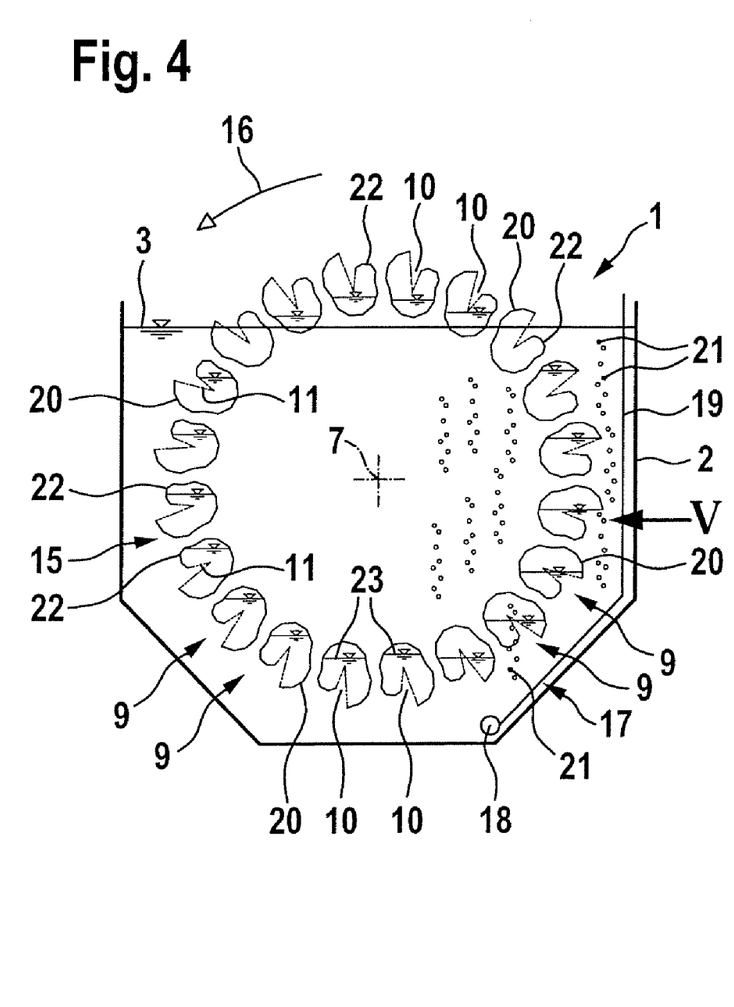
FIG. 4 shows a second embodiment of the device according to the invention for a modified tube wheel shown in a cross section representation along line IV-IV in FIG. 5.
Figure 5:
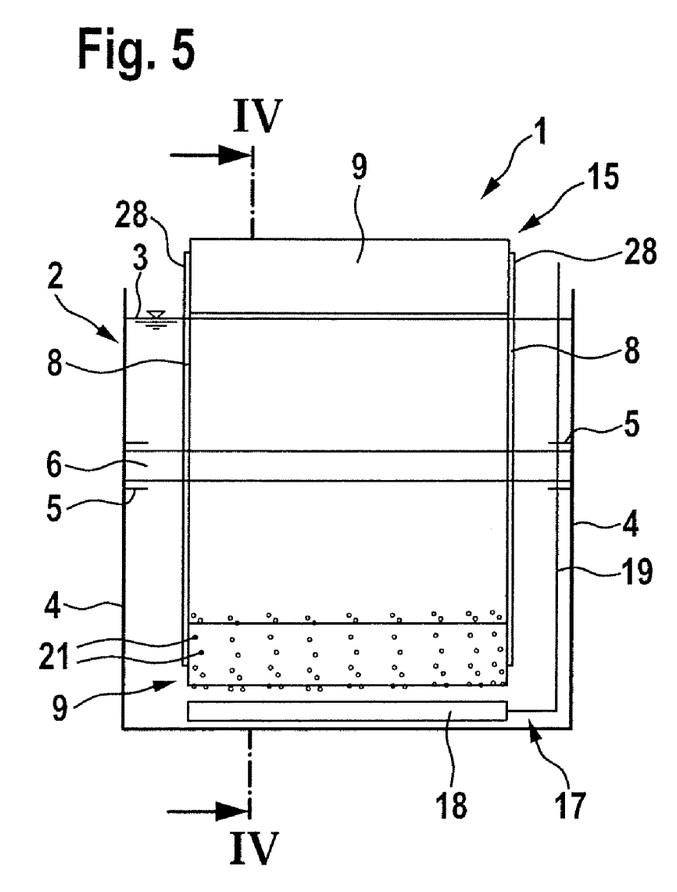
FIG. 5 shows the device shown in FIG. 4 in a view V according to FIG. 4.

The embodiment according to FIGS. 4 and 5, which also show a tube wheel 15, differs from that according to FIGS. 1 to 3 in that the respective tube 9 and/or the respective plastic plates 12 with shaped parts 20 are designed differently. Instead of the straight, plate-shaped shaped part 20 according to the embodiment in FIGS. 1 to 3, in the embodiment according to FIGS. 4 and 5, a shaped part 20 is provided that is represented as a bulge that connects to the tube 9 and is designed similarly to the bulge 22. This design of the shaped part 20 causes a large volume of the chambers 13 for holding air. Since air cannot be taken in when tube 9 is at a position before about 5 o'clock, the air goes on the outside past this tube 9. As the tube 9 proceeds in rotation direction 16 past the 5 o'clock position, the air, through its opening 10, enters into the chambers 13 assigned to the tubes 9. For the sake of simplicity, those components of the two embodiments that correlate in function are designated with the same reference numbers. This also applies to the other embodiment to be described in the following.

Figure 6:
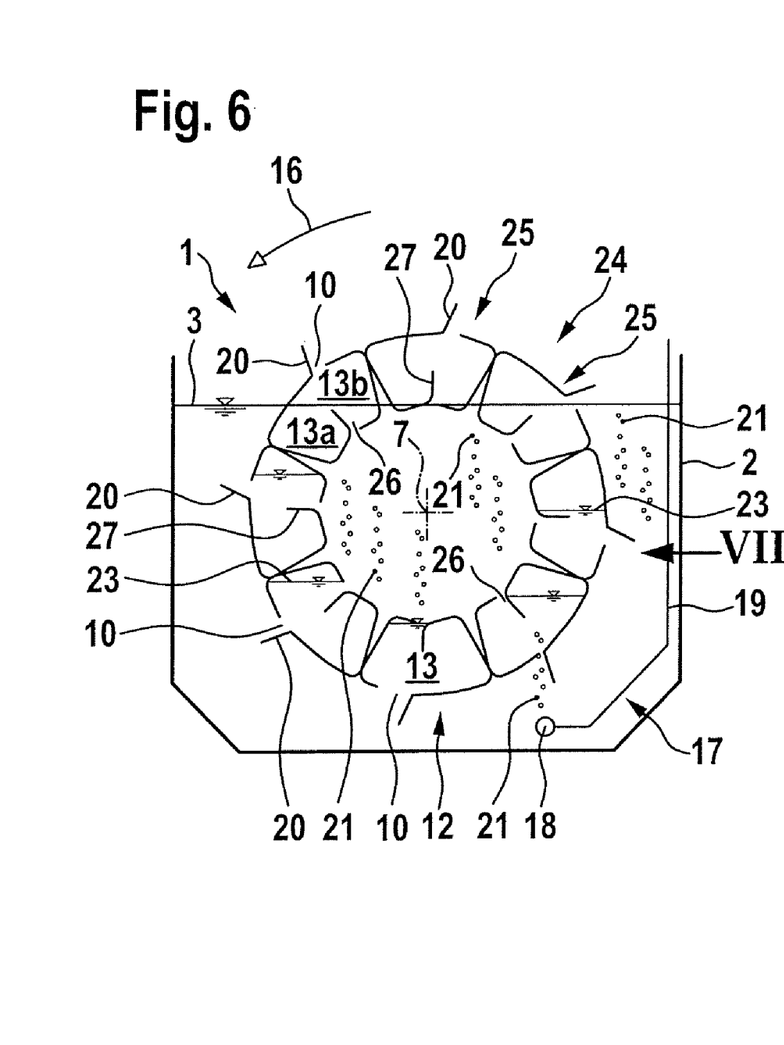
FIG. 6 shows a third embodiment of the device according to the invention that has a bucket wheel instead of a tube wheel, in a cross section along line VI-VI in FIG. 7
Figure 7:
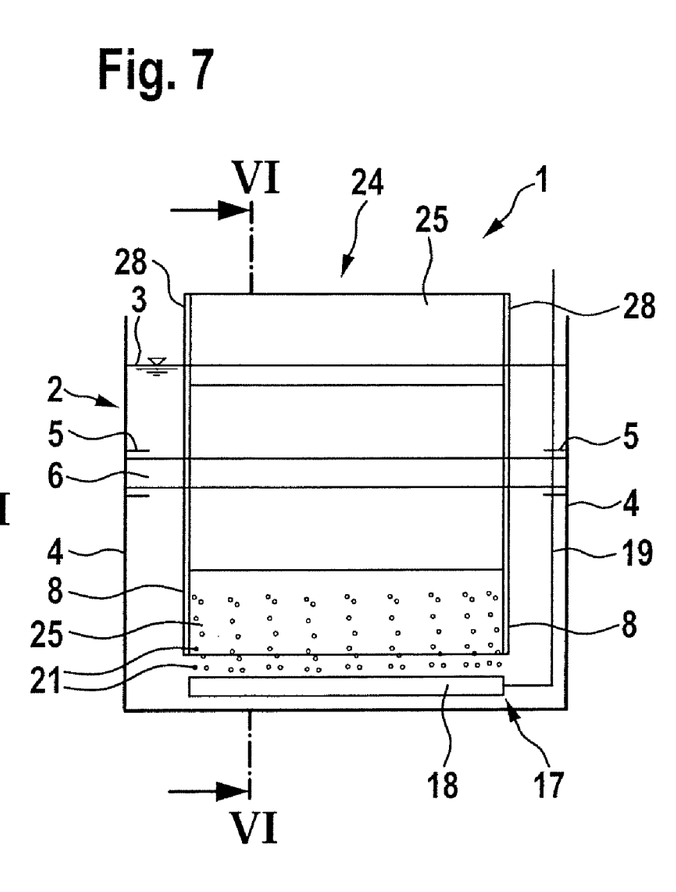
FIG. 7 shows a view of the device shown in FIG. 6 seen in the direction of arrow VII in FIG. 6.

FIGS. 6 and 7 show an embodiment in which the wheel is designed as a bucket wheel 24. The respective bucket 25 is formed by a number of plastic plates 12 stacked next to each other so that the chamber 13 results between adjacent plastic plates 12 in the way described above. Radially on the outside, the respective plastic plate 12 that is designed with a plate shape according to the embodiment according to FIGS. 1 to 3 is provided with the shaped part 20 in the manner described above. This shaped part 20 shifts in the rotational direction 16 of the bucket wheel 24 defines the opening 10 of the respective chamber 13. The bucket wheel 24 basically differs from the tube wheel 15 in that the respective bucket 25 is provided with another opening 26 radially on the inside, with respect to the respective chamber 13. Also, the chamber 13 positioned rotationally before the opening 26 is provided with a separating rib 27 that is pointed toward the shaped part 20, and extends over about half the radial expansion of the chamber. In this way, the chamber halves 13a and 13b are formed.

In the position of the respective bucket at about 5 o'clock, if air comes through the opening 10 into the chamber 13 of the adjacent plastic plates, it comes into the chamber 13a. The air stays there until the bucket 25 reaches about the 1 o'clock position, after which it escapes through the opening 10. Upon further rotation of the bucket wheel 24, water enters through the other opening 26 into the chamber 13b. With a rotation of the bucket wheel 24 into the area of 11 o'clock, the shaped part 20 prevents the liquid from entering into the chamber 13. Instead of that, air goes through the opening 10 into the chamber 13b and is retained there. At a position of the bucket wheel 24 that corresponds to about 8 o'clock, the air escapes from the chamber 13b through the opening 25 with continued rotation of the wheel. Thus in this embodiment, more air comes into the central area of bucket wheel 24, as is shown by the various bubbles 21.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows.

The invention claimed is:

1. An apparatus for aerobic biological treatment of waste water and the like, comprising:
   a tank configured to retain waste water therein;
   a wheel rotatably mounted in said tank for rotation about a generally horizontal axis, and including a plurality of chambers arranged in axial succession about the circumference of said wheel; said chambers including openings which are oriented generally upwardly when emerging from the waste water in said tank adjacent a top dead center position of said wheel, and are oriented generally downwardly when submerged in the waste water in said tank adjacent a bottom dead center position of said wheel;
   an air drive mechanism rotating said wheel about said horizontal axis relative to said tank;
   an air pipe communicating with said air drive mechanism, disposed generally below said wheel and configured to release therefrom air bubbles which enter said chambers rotationally after said bottom dead center position of said wheel; and
   a plurality of bubble collectors connected with and protruding radially outwardly from said wheel at locations rotationally preceding said openings in said chambers, and shaped to selectively guide the air bubbles from said air pipe through said openings into said chambers.

2. An apparatus as set forth in claim 1, wherein:
   said wheel is configured as either a bucket wheel or a tube wheel.

3. An apparatus as set forth in claim 2, wherein:
   said bubble collectors are oriented in the direction of said openings to guide the air bubbles into said openings of said chambers.

4. An apparatus as set forth in claim 3, wherein:
   said bubble collectors include a curved portion extending exterior of said chambers.

5. An apparatus as set forth in claim 4, wherein:
   said bubble collectors extend over and overlap said openings and have portions thereof defining portions of said chambers which are configured to collect the air bubbles therein.

6. An apparatus as set forth in claim 5, wherein:
   said bubble collectors are connected with said chambers, and are shaped to guide the air bubbles into the openings of said chambers.

7. An apparatus as set forth in claim 6, wherein:
   said chambers are configured to compress air disposed therein to around 30 to 80% of the original volume of said chambers.

8. An apparatus as set forth in claim 7, wherein:
   said wheel extends out of the waste water located in said tank by an amount in the range of 5 to 15%.

9. An apparatus as set forth in claim 8, wherein:
   said air pipe is disposed generally parallel to said axis of rotation of said wheel, extends generally over the axial length of said wheel, and includes a plurality of outlet openings to allow the air bubbles to release from the length of said air pipe.

10. An apparatus as set forth in claim 9, wherein:
    said air drive operates at a pressure of around 0.3 bar to 1.0 bar.

11. An apparatus as set forth in claim 10, wherein:
    each of said chambers includes a pair of plates disposed adjacent one another, which along with an associated one of said bubble collectors define an assembly.

12. An apparatus as set forth in claim 6, wherein:
    said bubble collectors are shaped such that they selectively overlap with adjacent ones of said bubble collectors, whereby the air bubbles that escape from said opening of one of said chambers are directed into said opening of said next adjacent one of said chambers in the direction of rotation of said wheel.

13. An apparatus as set forth in claim 1, wherein:
said bubble collectors are oriented in the direction of said openings to guide the air bubbles into said openings of said chambers.

14. An apparatus as set forth in claim 1, wherein:
said bubble collectors include a curved portion extending exterior of said chambers.

15. An apparatus as set forth in claim 1, wherein:
said bubble collectors extend over and overlap said openings and have portions thereof defining portions of said chambers which are configured to collect the air bubbles therein.

16. An apparatus as set forth in claim 1, wherein:
said bubble collectors are shaped such that they selectively overlap with adjacent ones of said bubble collectors, whereby the air bubbles that escape from said opening of one of said chambers are directed into said opening of said next adjacent one of said chambers in the direction of rotation of said wheel.

17. An apparatus as set forth in claim 1, wherein:
said chambers are configured to compress air disposed therein to around 30 to 80% of the original volume of said chambers.

18. An apparatus as set forth in claim 12, wherein:
said wheel extends out of the waste water located in said tank by an amount in the range of 5 to 15%.

19. An apparatus as set forth in claim 1, wherein:
said air pipe is disposed generally parallel to said axis of rotation of said wheel, extends generally over the axial length of said wheel, and includes a plurality of outlet openings to allow the air bubbles to release from the length of said air pipe.

20. An apparatus as set forth in claim 1, wherein:
said air drive operates at a pressure of around 0.3 bar to 1.0 bar.

21. An apparatus as set forth in claim 1, wherein:
each of said chambers includes a pair of plates disposed adjacent one another, which along with an associated one of said bubble collectors define an assembly.

* * * * *